United States Patent
Svendsen

(10) Patent No.: US 10,691,462 B2
(45) Date of Patent: *Jun. 23, 2020

(54) COMPACT LINKED-LIST-BASED MULTI-THREADED INSTRUCTION GRADUATION BUFFER

(71) Applicant: ARM Finance Overseas Limited, Cambridge (GB)

(72) Inventor: Kjeld Svendsen, San Jose, CA (US)

(73) Assignee: ARM Finance Overseas Limited, Cambridge (GB)

( * ) Notice: Subject to any disclaimer, the term of this patent is extended or adjusted under 35 U.S.C. 154(b) by 245 days.

This patent is subject to a terminal disclaimer.

(21) Appl. No.: 15/842,398

(22) Filed: Dec. 14, 2017

(65) Prior Publication Data

US 2018/0107486 A1 Apr. 19, 2018

Related U.S. Application Data

(63) Continuation of application No. 14/494,167, filed on Sep. 23, 2014, now Pat. No. 9,851,975, which is a (Continued)

(51) Int. Cl.
*G06F 9/30* (2018.01)
*G06F 9/38* (2018.01)

(52) U.S. Cl.
CPC ........ *G06F 9/3836* (2013.01); *G06F 9/30105* (2013.01); *G06F 9/384* (2013.01); *G06F 9/3851* (2013.01); *G06F 9/3867* (2013.01)

(58) Field of Classification Search
None
See application file for complete search history.

(56) References Cited

U.S. PATENT DOCUMENTS 5,091,851 A  2/1992  Shelton et al.
5,109,520 A  4/1992  Knierim
(Continued)

FOREIGN PATENT DOCUMENTS

GB  2322718  9/1998
WO  WO02082278  10/2002

OTHER PUBLICATIONS

Shen et al.; Modern Processor Design: Fundamentals of Superscalar Processors, Beta Edition; McGraw Hill; 2003.*
(Continued)

*Primary Examiner* — Corey S Faherty
(74) *Attorney, Agent, or Firm* — Patterson Thuente Pedersen, P.A.

(57) ABSTRACT

A processor and instruction graduation unit for a processor. In one embodiment, a processor or instruction graduation unit according to the present invention includes a linked-list-based multi-threaded graduation buffer and a graduation controller. The graduation buffer stores identification values generated by an instruction decode and dispatch unit of the processor as part of one or more linked-list data structures. Each linked-list data structure formed is associated with a particular program thread running on the processor. The number of linked-list data structures formed is variable and related to the number of program threads running on the processor. The graduation controller includes linked-list head identification registers and linked-list tail identification registers that facilitate reading and writing identifications values to linked-list data structures associated with particular program threads. The linked-list head identification registers determine which executed instruction result or results are next to be written to a register file.

20 Claims, 10 Drawing Sheets

Related U.S. Application Data continuation of application No. 11/362,763, filed on Feb. 28, 2006.

(56) References Cited

U.S. PATENT DOCUMENTS

| | | | |
|---|---|---|---|
| 5,325,511 | A | 6/1994 | Collins et al. |
| 5,452,426 | A | 9/1995 | Papworth et al. |
| 5,493,523 | A | 2/1996 | Huffman |
| 5,493,667 | A | 2/1996 | Huck et al. |
| 5,510,934 | A | 4/1996 | Brennen et al. |
| 5,526,504 | A | 6/1996 | Hsu et al. |
| 5,537,538 | A | 7/1996 | Bratt et al. |
| 5,546,545 | A | 8/1996 | Rich |
| 5,568,630 | A | 10/1996 | Killian et al. |
| 5,572,704 | A | 11/1996 | Bratt et al. |
| 5,586,278 | A | 12/1996 | Papworth et al. |
| 5,604,909 | A | 2/1997 | Joshi et al. |
| 5,606,683 | A | 2/1997 | Riordan |
| 5,632,025 | A | 5/1997 | Bratt et al. |
| 5,670,898 | A | 9/1997 | Fang |
| 5,675,759 | A | 10/1997 | Shebanow et al. |
| 5,734,881 | A | 3/1998 | White et al. |
| 5,740,402 | A | 4/1998 | Bratt et al. |
| 5,758,112 | A | 5/1998 | Yeager et al. |
| 5,764,999 | A | 6/1998 | Wilcox et al. |
| 5,765,037 | A | 6/1998 | Morrison et al. |
| 5,781,753 | A | 7/1998 | McFarland et al. |
| 5,784,584 | A | 7/1998 | Moore et al. |
| 5,799,165 | A | 8/1998 | Favor et al. |
| 5,802,339 | A | 9/1998 | Sowadsky et al. |
| 5,802,386 | A | 9/1998 | Kahle et al. |
| 5,809,326 | A | 9/1998 | Nogami |
| 5,809,336 | A | 9/1998 | Moore et al. |
| 5,881,257 | A | 3/1999 | Glass et al. |
| 5,884,061 | A | 3/1999 | Hesson et al. |
| 5,954,815 | A | 9/1999 | Joshi et al. |
| 5,961,629 | A | 10/1999 | Nguyen et al. |
| 5,966,734 | A | 10/1999 | Mohamed et al. |
| 5,974,535 | A | 10/1999 | Peng et al. |
| 6,044,478 | A | 3/2000 | Green |
| 6,076,159 | A | 6/2000 | Fleck et al. |
| 6,079,014 | A | 6/2000 | Papworth et al. |
| 6,085,315 | A | 7/2000 | Fleck et al. |
| 6,216,200 | B1 | 4/2001 | Yeager |
| 6,223,278 | B1 | 4/2001 | Morrison |
| 6,247,114 | B1 | 6/2001 | Trull |
| 6,247,124 | B1 | 6/2001 | Joshi et al. |
| 6,249,862 | B1 | 6/2001 | Chinnakonda et al. |
| 6,266,755 | B1 | 7/2001 | Yeager |
| 6,298,438 | B1 | 10/2001 | Thayer et al. |
| 6,308,252 | B1 | 10/2001 | Agarwal et al. |
| 6,393,550 | B1 | 5/2002 | Fetterman |
| 6,430,655 | B1 | 8/2002 | Courtright et al. |
| 6,473,837 | B1 | 10/2002 | Hughes et al. |
| 6,477,639 | B1 | 11/2002 | Krishnan et al. |
| 6,505,285 | B1 | 1/2003 | Rabinovici et al. |
| 6,546,477 | B1 | 4/2003 | Russo et al. |
| 6,557,127 | B1 | 4/2003 | Adams et al. |
| 6,594,728 | B1 | 7/2003 | Yeager |
| 6,598,148 | B1 | 7/2003 | Moore et al. |
| 6,691,221 | B2 | 2/2004 | Joshi et al. |
| 6,721,874 | B1 * | 4/2004 | Le .................. G06F 9/30094 712/218 |
| 6,757,817 | B1 | 6/2004 | Booth |
| 6,760,835 | B1 | 7/2004 | Yu |
| 6,836,833 | B1 | 12/2004 | Kinter et al. |
| 6,915,395 | B1 | 7/2005 | Singh |
| 6,915,495 | B2 | 7/2005 | La Scala |
| 6,931,639 | B1 | 8/2005 | Eickemeyer |
| 7,032,226 | B1 | 4/2006 | Nemirovsky et al. |
| 7,370,178 | B1 | 5/2008 | Svendsen et al. |
| 7,401,205 | B1 | 7/2008 | Dally et al. |
| 7,502,876 | B1 | 3/2009 | Nemirovsky et al. |
| 7,747,840 | B2 | 6/2010 | Svendsen et al. |
| 2003/0149862 | A1 | 8/2003 | Kadambi |
| 2004/0128483 | A1 | 7/2004 | Grochowski et al. |
| 2004/0193858 | A1 | 9/2004 | Ahmad et al. |
| 2004/0210743 | A1 | 10/2004 | Burky et al. |
| 2005/0102483 | A1 | 5/2005 | Kinter et al. |
| 2006/0095732 | A1 | 5/2006 | Tran et al. |
| 2006/0149904 | A1 | 7/2006 | Mowry |
| 2006/0259747 | A1 | 11/2006 | Gonzalez et al. |
| 2007/0204139 | A1 | 8/2007 | Svendsen |
| 2008/0016326 | A1 | 1/2008 | Svendsen et al. |
| 2008/0215857 | A1 | 9/2008 | Svendsen et al. |
| 2015/0012730 | A1 | 1/2015 | Svendsen |
| 2015/0234657 | A1 | 8/2015 | Svendsen et al. |

OTHER PUBLICATIONS

Application and File history for U.S. Appl. No. 14/494,167, filed Sep. 23, 2014. Inventor: Svendsen.

Application and File history for U.S. Appl. No. 11/362,763, filed Feb. 28, 2006. Inventor: Svendsen.

Application and File history for U.S. Appl. No. 11/485,960, filed Jul. 14, 2006. Inventors: Svendsen et al.

Application and File history for U.S. Appl. No. 14/704,416, filed May 5, 2015. Inventors: Svendsen et al.

Office Communication, dated Jun. 24, 2009, for U.S. Appl. No. 12/104,308, filed Apr. 16, 2008, 5 pages.

ADSP-21535 Blackfm™ DSP Brochure, Analog Devices, Inc., 4 pages (2001).

*Andes R10000 User's Manual*, Revision 2.0, MIPS Technologies, Inc., Entire Text (Sep. 19, 1996).

Arvind, A. and Maessen, J.W., "Memory Model= Instruction Reordering+ Store Atomicity," *A CM SIGARCH Computer Architecture News*, vol. 34, Issue 2, pp. 29-40 (May 2006).

Banakar, R. et al., "Scratchpad Memory: A Design Alternative for Cache On-chip memory in Embedded Systems," *Proceedings of CODES '02*, ACM, Estes Park,Colorado, pp. 73-78 (May 2002).

Bellas, N. et al., "Architectural and Compiler Techniques for Energy Reduction in High-Performance Microprocessors," *IEEE Trans. on Very Large Scale Integration (VLSI) Systems*, vol. 8, No. 3, pp. 317-326 (Jun. 2000).

Bird, P.L. et al., "The Effectiveness of Decoupling," *Proceedings of the 7th Int'l Conference on Supercomputing*, pp. 47-56, ACM Press, New York, NY.

Bratt, J.P. et al., U.S. Appl. No. 08/168,094, filed Dec. 15, 1993, entitled "Superscalar Microprocessor Instruction Pipeline Including Instruction Dispatching and Kill Control".

Buti, T.N. et al., "Organization and implementation of the register-renaming mapper for out-of-order IBM POWER4 processors," *IBM J. Res. & Dev.* 49(/):167-188, International Business Machines Corporation (Jan. 2005).

Cotterell, S. and Vahid, F., "Tuning of Loop Cache Architecture to Programs in Embedded System Design," *ISSS'02*, 6 pages (Oct. 2002).

Courtright, D., "Introducing: The MIPS32™ 4Kc™ and MIPS32™ 4Kp™ Processor Cores 'Jade'," paper slide presentation distributed at the Embedded Microprocessor Forum, pp. 1-25 (May 1999).

Dally, W.J. et al., U.S. Appl. No. 09/637,500, filed Aug. 11, 2000, entitled "High Performance RISC Instruction Set Digital Signal Processor Having Circular Buffer and Looping Controls".

De Vries, H., *Understanding the detailed Architecture of AMD's 64 bit Core*, 85 pages, printed Oct. 16, 2007 from http://chiparchitect.com/news/2003 09 21 Detailed Architecture of AMDs 64bit Core.html (Sep. 21, 2003).

Flynn et al., "Using Simple Tools to Evaluate Complex Architectural Trade-Offs," *IEEE Micro*, pp. 67-75 (Jul.-Aug. 2000).

Fukuoka, K. et al., "Leakage Power Reduction for Clock Gating Scheme on PD-SOI," *IEEE Computer Society Int'l Symp. on Circuits and Systems*, pp. 613-616 (2004).

Goodman, J.R. et al., "PIPE: A VLSI Decoupled Architecture," *ACM SIGARCH Computer Architecture News*, pp. 20-27, ACM Press, New York, NY (Jun. 1985).

Gwennap, L., "MIPS R10000 Uses Decoupled Architecture," *Microprocessor Report*, vol. 8, No. 14, pp. 1-5 (Oct. 24, 1994).

(56) References Cited

OTHER PUBLICATIONS

Gwennap, L., "MIPS R12000 to Hit 300 MHz," *Microprocessor Report*, vol. 11, No. 13, pp. 1-4 (Oct. 6, 1997).
Gwennap, L., "MIPS Roadmap Focuses on Bandwidth," *Microprocessor Report*, pp. 1-3 (May 12, 1997).
Gwennap, L., "SGI Provides Overview of TFP CPU," *Microprocessor Report*, vol. 7,No. 2, pp. 1-2 (Feb. 15, 1993).
Gwennap, L., "TFP Designed for Tremendous Floating Point," *Microprocessor Report*, vol. 7, No. 11, pp. 1-5 (Aug. 23, 1993).
*Intel Architecture Software Developer's Manual*—vol. 2: Instruction Set Reference, Intel. Corporation, pp. 3-278 and 3-279 (1997).
*Intel Architecture Software Developer's Manual*, vol. 1-3, pp. 2-7, 2-10, 2-11, 2-12,3-320, 9-16, A-10, and A-20 (1999).
*Intel® StrongARM® SA-1100 Microprocessor Developer's Manual*, Intel. Corporation, pp. i-xix, 1-1 through 1-7, 2-1 through 2-8, and 6-1 through 6-7 (Aug. 1999).
Kandemir, M. et al., "Dynamic Management of Scratch-Pad Memory Space," *Proceedings of the 38th Design Automation Conference*, ACM, Las Vegas, Nevada, pp. 690-695 (Jun. 2001).
Kandemir, M. et al., "Exploiting Scratch Pad Memory Using Presburger Formulas," *Proceedings ofiSSS '0J*, ACM, Montreal, Quebec, Canada, pp. 7-12 (Oct. 2001).
Kandemir, M. et al., "Exploiting Shared Scratch Pad Memory Space in Embedded Multiprocessor Systems," *Proceedings of the 391h Design Automation Conference*, ACM,New Orleans, Louisiana, pp. 219-224 (Jun. 2002).
Kiyohara, T. et al., "Register Connection: A New Approach to Adding Registers into NPL26 Instruction Set Architectures," *Int'l Conf on Computer Architecture—Proc. of the 20$^{th}$ Annual Int'l. Symp. on Computer Architecture*, San Diego, CA, pp. 247-256 (1993).
Krewell, K., "Intel Looks to Core for Success", Microprocessor Report, val. 20, pp. 1, 4, 5 and 6 (Mar. 2006).
Lee, L.H. et al., "Instruction Fetch Energy Reduction Using Loop Caches for Embedded Applications with Small Tight Loops," *ISLPED '99*, pp. 267-269 (1999).
Lipasti, M. et al., "Physical Register Inlining," at <http://www.ece.wisc.edu/-gharm/gagers/isca2004 egunadi.gdf>, 11 pages (retrieved Jun. 12, 2006).
Merten, M.C. et al., "Modulo Schedule Buffers", IEEE, pp. 138-149 (Dec. 2001).
*MIPS R10000 Microprocessor User's Manual, Version 2.0*, MIPS Technologies, Inc., 424 pages (Jan. 29, 1997).
Nass, R., "Latest DSPs Poised to Drive 3G Revolution," *Portable Design* 8(9):26, 27, 28, 32, and 34, Penn Well Corporation, Fair Lawn, New Jersey (Sep. 2001).
Nemirovsky, M. et al., U.S. Appl. No. 09/602,279, filed Jun. 23, 2000, entitled "Methods and Apparatus for Background Memory Management".
Osborne, M. et al., "Superscalar Pipeline Architectures," Slide Presentation, 37 pages, downloaded Jun. 19, 2007 from http://www.academic.marist.edu/-jzbv/architecture/projects2004/SuperscalarArchitectures.ppt (Apr. 19, 2004).

Panda, P. et al., "Data Memory Organization and Optimizations in Application-Specific Systems," *IEEE Design & Test of Computers*, IEEE, pp. 56-68 (May 2001).
Panda, P. et al., "Efficient Utilization of Scratch-Pad Memory in Embedded Processor Applications," *Proceedings of the European Design & Test Conference ED&TC 97*,IEEE, Paris France, pp. 7-11 (Mar. 1997).
Peng, M. and Azgomi, S., "Content-Addressable memory (CAM) and its network applications," at<http://www.eetasia.com/ARTICLES/2000MA Y /2000MA Y03 3 pages (retrieved Jun. 12, 2006).
Pierce, J. and Mudge, T., "Wrong-Path Instruction Prefetching," *IEEE Computer Society 29th Int'l. Symp. on Microarchitecture*, pp. 165-175 (1996).
Price, C., *MIPS R10000MIPS IV !SA Manual: Andes*, Revision 3.2, MIPS Technologies, Inc., 323 pages (Sep. 1995).
Rhodes, S., *MIPS R8000 Microprocessor Chip Set User's Manual*, Revision 3.0, Silicon Graphics, Inc., 352 pages (Jul. 1994).
Schmidt, D.C., "Transparently Parameterizing Synchronization into a Concurrent Distributed Application: A Case Study of C++ Design Evolution," *C++ Report*, SIGS Publications, vol. 6, No. 3, 10 pages (Jul.-Aug. 1994).
Shen et al., *Modern Processor Design*, McGraw-Hill, published Jul. 7, 2009, pp. 239-242 and 254-259.
Smith, J.E. et al., "The ZS-1 Central Processor," *Proceedings of the Second Int'l Conference on Architectural Support for Programming Languages and Operating Systems*, pp. 199-204, IEEE Computer Society Press, Los Alamitos, CA (1987).
Smith, J.E., "Retrospective: Decoupled Access/Execute Computer Architectures," *25 Years of the international Symposia on Computer Architecture (Selected Papers)*, pp. 27-28, ACM Press, New York, NY (Jun. 1998).
Solomon, B. et al., "Micro-Operation Cache: A Power Aware Frontend for Variable Instruction Length ISA," *Syrnp. on Low Power Electronics and Design*, pp. 4-9 (Aug. 2001).
*SPARC64 V Processor for UNIX Server*, Revision 1.0, Fujitsu Limited, 24 pages (Aug. 2004).
Sung, M. et al., "Multithreading Decoupled Architectures for Complexity-Effective General Purpose Computing," *ACM SIGARCH Computer Architecture News*, vol. 29, Issue 5, pp. 56-61, ACM Press, New York, NY (Dec. 2001).
Svendsen, K. et al., U.S. Appl. No. 11/485,959, filed Jul. 14, 2006, entitled Method for Latest Producer Tracking in an Out-of-Order Processor, and Applications Thereof.
Taylor, M., *The Raw Prototype Design Document*, Dept. of Electrical Engineering and Computer Science—Massachusetts Institute of Technology, pp. 1, 5, 6, 10, and 53 (Nov. 1999).
*VRSeries™ User's Manual: VR10000™ Microprocessor, Version 1.0*, NEC, Entire Text (Nov. 1995).
Watts, C. et al., "ARM Intelligent Energy Manager Future Evolution," paper slide presentation distributed at the ARM Developers' Conference '04, 34 sheets (Oct. 2004).
Yeager, K.C., "The MIPS R10000 Superscalar Microprocessor," *IEEE Micro*, pp. 28-40 (1996).
Yeager, The MIPS R10000 Superscalar Microprocessor, Apr. 1996, pp. 28-40.

\* cited by examiner

Table 1. Clock-By-Clock Progress Of Allocation And Graduation
(Single Thread Operation)

| Clock Cycle | Instruction Decode and Dispatch Unit | Linked-List Data Structure | | Instruction Graduation Unit | Data Structure List Entries | | | | |
|---|---|---|---|---|---|---|---|---|---|
| | | Head ID | Tail ID | | Buffer IDs | | | | |
| | | | | | 0 | 5 | 7 | 10 | N |
| 1 | A(0) | I | I | I | | | | | |
| 2 | A(5) | V0 | V0 | I | | | | | |
| 3 | A(7) | V0 | V5 | I | | | | | |
| 4 | A(10) | V0 | V7 | I | | | | | |
| 5 | I | V0 | V10 | G(0) | 5 | | | | |
| 6 | I | V5 | V10 | G(5) | 5 | 7 | 10 | | |
| 7 | I | V7 | V10 | G(7) | 5 | 7 | 10 | | |
| 8 | I | V10 | V10 | G(10) | 5 | 7 | 10 | | |
| 9 | A(N) | I | I | I | 5 | 7 | 10 | | |
| 10 | I | VN | VN | I | 5 | 7 | 10 | | |

I: Invalid or Inactive
V: Valid
A: Allocate
G: Graduate

FIG. 5

Table 2: Thread Head ID And Thread Tail ID Update Logic

| Head ID State | Tail ID State | Does Head ID Equal Tail ID? | Instruction Decode And Dispatch Unit Action | Instruction Graduation Unit Action | New Head ID State | New Tail ID State |
|---|---|---|---|---|---|---|
| I | I | DC | I | I | I, NC | I, NC |
| V | V | No | I | I | V, NC | V, NC |
| V | V | Yes | I | I | V, NC | V, NC |
| I | I | DC | A | I | V, New ID | V, New ID |
| V | V | No | A | I | V, NC | V, New ID |
| V | V | Yes | A | I | V, New ID | V, New ID |
| I | I | DC | I | G | NP | NP |
| V | V | No | I | G | V, New ID | V, NC |
| V | V | Yes | I | G | I | I |
| I | I | DC | A | G | NP | NP |
| V | V | No | A | G | V, New ID | V, New ID |
| V | V | Yes | A | G | V, New ID | V, New ID |

V: Valid
NP: Not Possible
NC: No Change
I: Invalid or Inactive
A: Allocate
G: Graduate
DC: Don't Care

FIG. 6

Table 3: Clock-By-Clock Progress Of Allocation And Graduation (Single Thread Operation)

| Clock Cycle | Instruction Decode and Dispatch Unit | | Linked-List Data Structure | | | | Instruction graduation Unit | | Data Structure List Entries / Buffer IDs | | | | | | | | |
|---|---|---|---|---|---|---|---|---|---|---|---|---|---|---|---|---|---|
| | Instr. 0 | Instr. 1 | Head ID-0 | Head ID-1 | Tail ID-0 | Tail ID-1 | Instr. 0 | Instr. 1 | 0 | 5 | 7 | 10 | 12 | 15 | 21 | 22 | N |
| 1 | A(0) | I | I | I | I | I | I | I | | | | | | | | | |
| 2 | A(5) | A(7) | V0 | I | V0 | I | I | I | | | | | | | | | |
| 3 | A(10) | A(12) | V0 | V5 | V5 | V7 | I | I | | | | | | | | | |
| 4 | I | I | V7 | V10 | V10 | V12 | G(0) | G(5) | | | 7 | 10 | 12 | | | | |
| 5 | A(15) | A(21) | V10 | V12 | V12 | V15 | G(7) | G(10) | | | 7 | 10 | 12 | 15 | | | |
| 6 | A(22) | A(N) | V12 | V21 | V15 | V22 | G(12) | G(15) | | | 7 | 10 | 12 | 15 | 21 | 22 | |
| 7 | I | I | V21 | V22 | V21 | VN | G(21) | G(22) | | | 7 | 10 | 12 | 15 | 21 | 22 | N |
| 8 | I | I | V22 | I | VN | I | G(N) | I | | | 7 | 10 | 12 | 15 | 21 | 22 | N |

I: Invalid or Inactive
V: Valid
A: Allocate
G: Graduate

FIG. 9

Table 4: Example Thread Head ID And Thread Tail ID Update Logic

| Head ID State | | Tail ID State | | Does Head ID-0 Equal Tail ID-0? | Does Head ID-1 Equal Tail ID-1? | Does Head ID-0 Equal Tail ID-0? | Instruction Decode And Dispatch Unit Action | | Instruction Graduation Unit Action | | New Head ID State | | New Tail ID State | |
|---|---|---|---|---|---|---|---|---|---|---|---|---|---|---|
| ID-0 | ID-1 | ID-0 | ID-1 | | | | ID-0 | ID-1 | ID-0 | ID-1 | ID-0 | ID-1 | ID-0 | ID-1 |
| I | I | I | I | DC | DC | DC | — | — | — | — | I, NC | I, NC | I, NC | I, NC |
| V | V | V | I | No | DC | DC | — | — | — | — | V, NC | I, NC | V, NC | I, NC |
| V | V | V | I | Yes | DC | DC | — | — | — | — | V, NC | I, NC | V, NC | I, NC |
| ... | ... | ... | ... | ... | ... | ... | ... | ... | ... | ... | ... | ... | ... | ... |
| V | V | V | V | Yes | Yes | NP | A | A | G | G | V, New ID | V, New ID | V, New ID | V, New ID |

V: Valid
NP: Not Possible
NC: No Change
I: Invalid or Inactive
A: Allocate
G: Graduate
DC: Don't Care

FIG. 10

COMPACT LINKED-LIST-BASED MULTI-THREADED INSTRUCTION GRADUATION BUFFER

RELATED APPLICATIONS

This application is a continuation of application Ser. No. 14/494,167 filed Sep. 23, 2014, which in turn is a continuation of application Ser. No. 11/362,763 filed Feb. 28, 2006, now abandoned, each of which is hereby fully incorporated herein by reference.

FIELD OF THE INVENTION

The present invention relates generally to processors and more particularly to processors having an out-of-order execution pipeline.

BACKGROUND OF THE INVENTION

Reduced Instruction Set Computer (RISC) processors are well known. RISC processors have instructions that facilitate the use of a technique known as pipelining. Pipelining enables a processor to work on different steps of an instruction at the same time and thereby take advantage of parallelism that exists among the steps needed to execute an instruction. As a result, a processor can execute more instructions in a shorter period of time. Additionally, modern Complex Instruction Set Computer (CISC) processors often translate their instructions into micro-operations (i.e., instructions similar to those of a RISC processor) prior to execution to facilitate pipelining.

Many pipelined processors, especially those used in the embedded market, are relatively simple single-threaded in-order machines. As a result, they are subject to control, structural, and data hazard stalls. More complex processors are typically multi-threaded processors that have out-of-order execution pipelines. These more complex processors schedule execution of instructions around hazards that would stall an in-order machine.

A conventional multi-threaded out-of-order processor has multiple dedicated buffers that are used to reorder instructions executed out-of-order so that each instruction graduates (i.e., writes its result to a general purpose register file and/or other memory) in program order. For example, a conventional N-threaded out-of-order processor has N dedicated buffers for ensuring instructions graduate in program order; one buffer for each thread that can be run on the processor. A shortcoming of this approach, for example, is that it requires a significant amount of integrated circuit chip area to implement N separate buffers. This approach can also degrade performance in some designs when only a single program thread is running on a multi-threaded processor, for example, if each of the N buffers is limited in size in order to reduce the overall area of the N buffers.

What is needed is a processor that overcomes the limitations noted above.

BRIEF SUMMARY OF THE INVENTION

The present invention provides a processor, an instruction graduation unit for a processor, and applications thereof. In one embodiment, a processor or an instruction graduation unit according to the present invention includes a linked-list-based multi-threaded graduation buffer and a graduation controller.

The graduation buffer is used to temporarily store identification values generated by an instruction decode and dispatch unit of the processor. The identification values specify buffer registers used to temporarily store executed instruction results until the results are written to a register file. The identification values generated by the instruction decode and dispatch unit are stored in the graduation buffer and form part of one or more linked-list data structures. Each linked-list data structure formed is associated with a particular program thread running on the processor. Accordingly, the number of linked-list data structures formed is variable and related to the number of program threads running on the processor.

The graduation controller is coupled to the graduation buffer and includes both linked-list head identification registers and linked-list tail identification registers. The linked-list head identification registers and the linked-list tail identification registers facilitate reading and writing identifications values generated by the instruction decode and dispatch unit of the processor to a linked-list data structure associated with a particular program thread. The linked-list head identification registers determine which executed instruction result or results are next to be written to the register file.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 5 is a first table illustrating operation of the graduation buffer and the graduation controller of FIG. 3.

FIG. 6 is a second table illustrating operation of the graduation buffer and the graduation controller of FIG. 3.

FIG. 9 is a first table illustrating operation of the graduation buffer and the graduation controller of FIG. 7.

FIG. 10 is a second table illustrating operation of the graduation buffer and the graduation controller of FIG. 7.

The present invention is described with reference to the accompanying drawings. The drawing in which an element first appears is typically indicated by the leftmost digit or digits in the corresponding reference number.

DETAILED DESCRIPTION OF THE INVENTION

The present invention provides a processor, an instruction graduation unit for a processor, and applications thereof. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
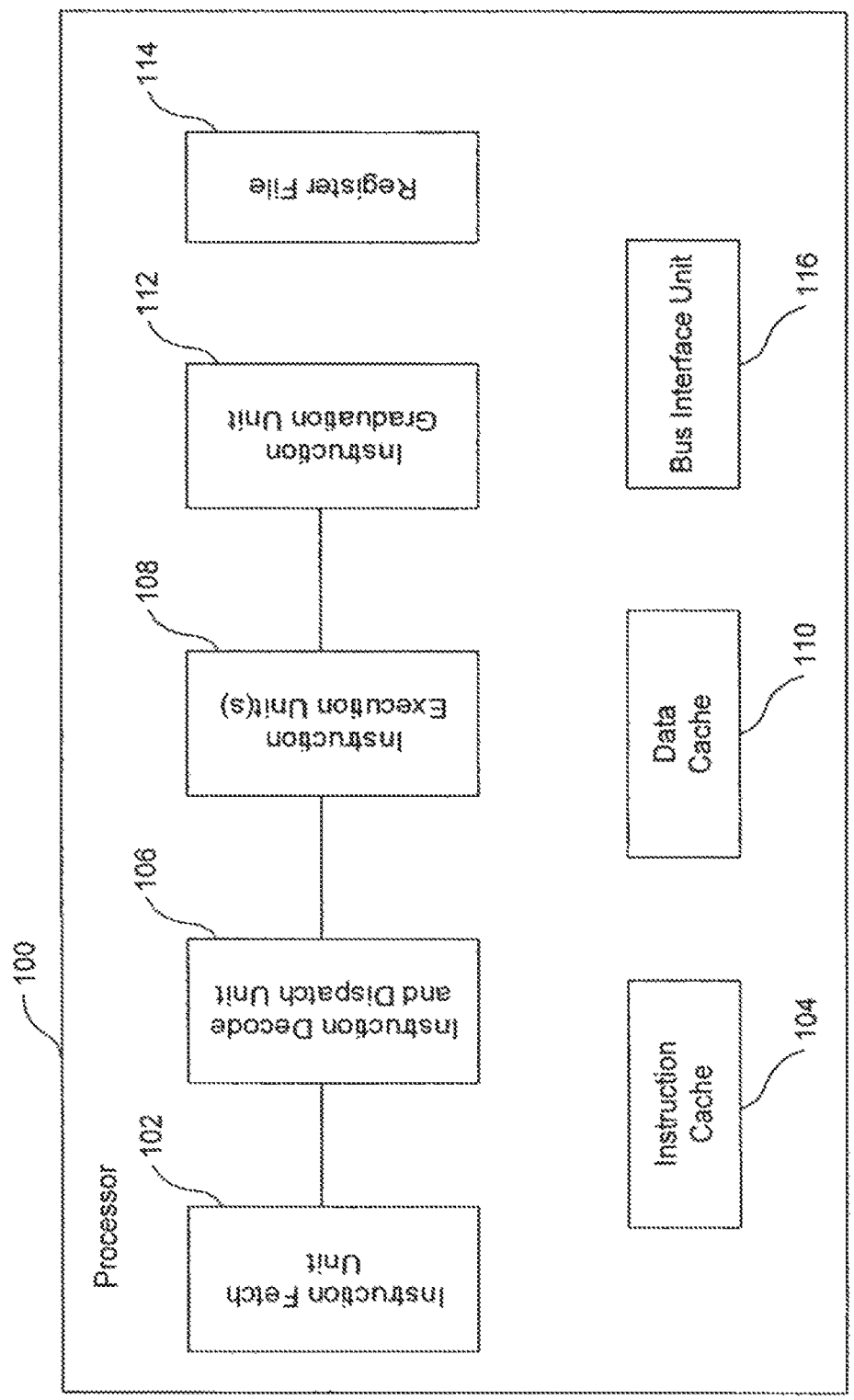
FIG. 1 is a diagram of a processor according to an embodiment of the present invention.

FIG. 1 illustrates an example processor 100 according to an embodiment of the present invention. As shown in FIG. 1, processor 100 includes an instruction fetch unit 102, an instruction cache 104, an instruction decode and dispatch unit 106, one or more instruction execution unit(s) 108, a data cache 110, an instruction graduation unit 112, a register file 114, and a bus interface unit 116. Processor 100 is capable of implementing multi-threading. As used herein, multi-threading refers to an ability of an operating system and a processor to execute different parts of a program, called threads, simultaneously.

Instruction fetch unit 102 retrieves instructions from instruction cache 104 and provides instructions to instruction decode and dispatch unit 106. Instructions are retrieved in program order, for example, for one or more program threads. In one embodiment, instruction fetch unit 102 includes logic for recoding compressed format instructions to a format that can be decoded and executed by processor 100. In one embodiment, instruction fetch unit 102 includes an instruction buffer that enables instruction fetch unit 102 to hold multiple instructions for multiple program threads, which are ready for decoding, and to issue more than one instruction at a time to instruction decode and dispatch unit 106.

Instruction cache 104 is an on-chip memory array organized as a direct associative or multi-way set associative cache such as, for example, a 2-way set associative cache, a 4-way set associative cache, an 8-way set associative cache, et cetera. In one embodiment, instruction cache 104 is virtually indexed and physically tagged, thereby allowing virtual-to-physical address translations to occur in parallel with cache accesses. Instruction cache 104 interfaces with instruction fetch unit 102.

Instruction decode and dispatch unit 106 receives one or more instructions at a time from instruction fetch unit 102 and decodes them prior to execution. In one embodiment, instruction decode and dispatch unit 106 receives at least one instruction for each program thread being implemented during a particular clock cycle. As described herein, the number of program threads being implemented at any given point in time is variable. Decoded instructions are stored in a decoded instruction buffer and issued to instruction execution unit(s) 108, for example, after it is determined that selected operands are available. Instructions can be dispatched from instruction decode and dispatch unit 106 to instruction execution unit(s) 108 out of program order.

Instruction execution unit(s) 108 execute instructions dispatched by instruction decode and dispatch unit 106. In one embodiment, at least one instruction execution unit 108 implements a load-store (RISC) architecture with single-cycle arithmetic logic unit operations (e.g., logical, shift, add, subtract, etc.). Other instruction execution unit(s) 108 can include, for example, a floating point unit, a multiple-divide unit and/or other special purpose co-processing units. In embodiments having multiple instruction execution units 108, one or more of the units can be implemented, for example, to operate in parallel. Instruction execution unit(s) 108 interface with data cache 110, register file 114, and a results buffer (not shown).

Data cache 110 is an on-chip memory array. Data cache 110 is preferably virtually indexed and physically tagged. Data cache 110 interfaces with instruction execution unit(s) 108.

Register file 114 represents a plurality of general purpose registers, which are visible to a programmer. Each general purpose register is a 32-bit or a 64-bit register, for example, used for logical and/or mathematical operations and address calculations. In one embodiment, register file 114 is part of instruction execution unit(s) 108. Optionally, one or more additional register file sets (not shown), such as shadow register file sets, can be included to minimize content switching overhead, for example, during interrupt and/or exception processing.

Bus interface unit 116 controls external interface signals for processor 100. In one embodiment, bus interface unit 116 includes a collapsing write buffer used to merge write-through transactions and gather writes from uncached stores. Processor 100 can include other features, and thus it is not limited to having just the specific features described herein.

Figure 2:
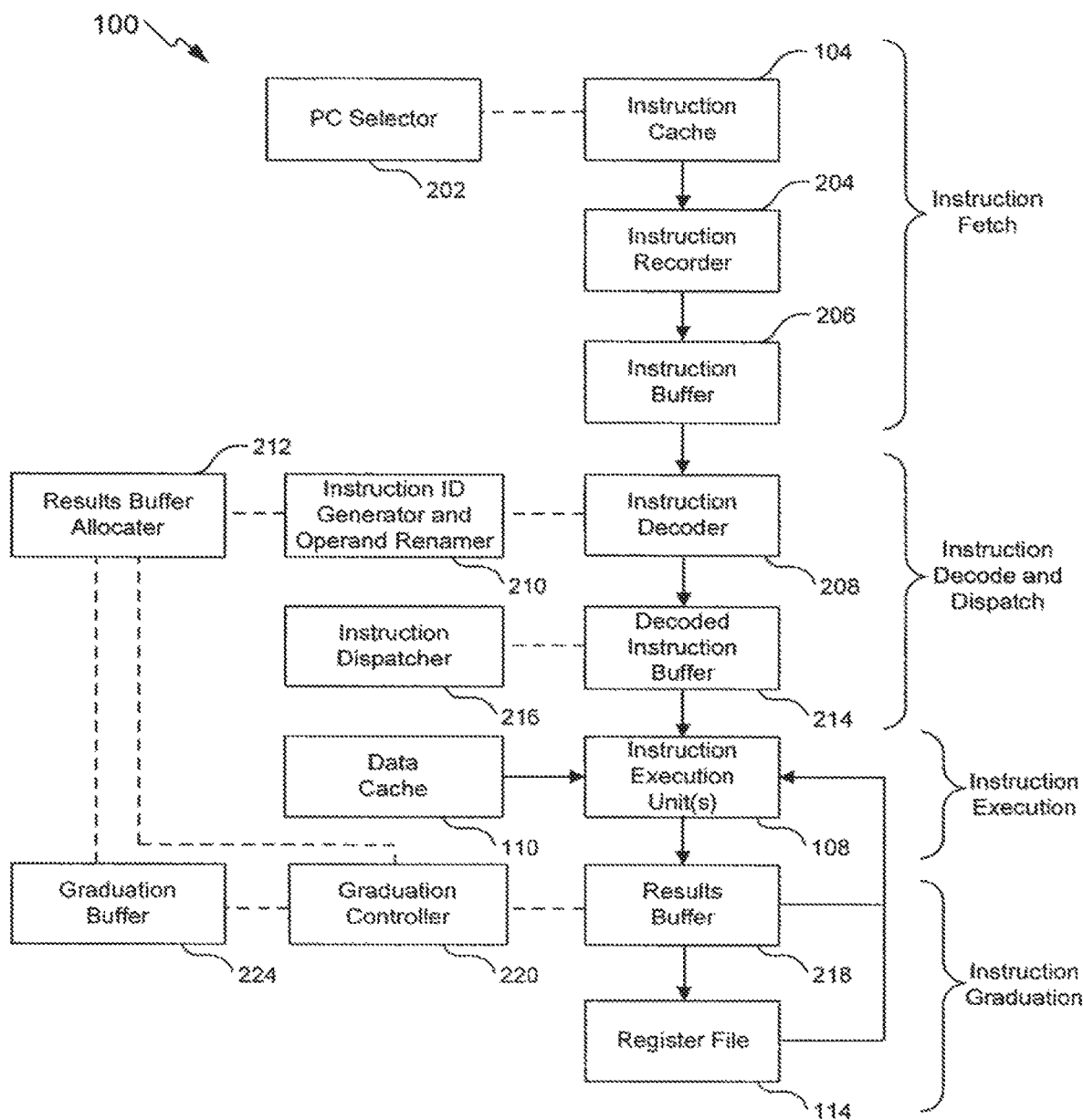
FIG. 2 is a more detailed diagram of the processor of FIG. 1.

FIG. 2 is a more detailed diagram of processor 100. As illustrated in FIG. 2, processor 100 performs four basic functions: instruction fetch; instruction decode and dispatch; instruction execution; and instruction graduation. These four basic functions are illustrative and not intended to limit the present invention.

Instruction fetch (represented in FIG. 1 by instruction fetch unit 102) begins when a PC selector 202 selects amongst a variety of program counter values and determines a value that is used to fetch an instruction from instruction cache 104. In one embodiment, the program counter value selected is the program counter value of a new program thread, the next sequential program counter value for an existing program thread, or a redirect program counter value associated with a branch instruction or a jump instruction. After each instruction is fetched, PC selector 202 selects a new value for the next instruction to be fetched.

During instruction fetch, tags associated with an instruction to be fetched from instruction cache 104 are checked. In one embodiment, the tags contain precode bits for each instruction indicating instruction type. If these precode bits indicate that an instruction is a control transfer instruction, a branch history table is accessed and used to determine whether the control transfer instruction is likely to branch or likely not to branch.

In one embodiment, any compressed-format instructions that are fetched are recoded by an optional instruction recoder 204 into a format that can be decoded and executed by processor 100. For example, in one embodiment in which processor 100 implements both 16-bit instructions and 32-bit instructions, any 16-bit compressed-format instructions are recoded by instruction recoder 204 to form instructions having 32 bits. In another embodiment, instruction recoder 204 recodes both 16-bit instructions and 32-bit instructions to a format having more than 32 bits.

After optional recoding, instructions are written to an instruction buffer 206. In one embodiment, this stage can be bypassed and instructions can be dispatched directly to instruction decoder 208.

Instruction decode and dispatch (represented in FIG. 1 by instruction decode and dispatch unit 106) begins, for example, when one or more instructions are received from instruction buffer 206 and decoded by an instruction decoder 208. In one embodiment, following resolution of a branch misprediction, the ability to receive instructions from instruction buffer 206 may be temporarily halted until selected instructions residing within the instruction execution portion and/or instruction graduation portion of processor 100 are purged.

In parallel with instruction decoding, operands are renamed. Register renaming map(s) located within instruction identification (ID) generator and operand renamer 210 are updated and used to determine whether required source operands are available, for example, in register file 114 and/or a results buffer 218. A register renaming map is a structure that holds the mapping information between programmer visible architectural registers and internal physical registers of processor 100. Register renaming map(s) indicate whether data is available and where data is available. As will be understood by persons skilled in the relevant arts given the description herein, register renaming is used to remove instruction output dependencies and to ensure that there is a single producer of a given register in processor 100 at any given time. Source registers are renamed so that data is obtained from a producer at the earliest opportunity instead of waiting for the processor's architectural state to be updated. In parallel with instruction decoding, instruction ID generator and operand renamer 210 generates and assigns an instruction ID tag to each instruction. An instruction ID tag assigned to an instruction is used, for example, to determine the program order of the instruction relative to other instructions. In one embodiment, each instruction ID tag is a thread-specific sequentially generated value that uniquely determines the program order of instructions. The instruction ID tags can be used to facilitate graduating instructions in program order, which were executed out of program order.

Each decoded instruction is assigned a results buffer identification value or tag by a results buffer allocater 212. The results buffer identification value determines the location in results buffer 218 where instruction execution unit(s) 108 can write calculated results for an instruction. In one embodiment, the assignment of results buffer identification values are accomplished using a free list. The free list contains as many entries as the number of entries in results buffer 218. The free list can be implemented, for example, using a bitmap. A first bit of the bitmap can be used to indicate whether the results buffer entry is either available (e.g., if the bit has a value of one) or unavailable (e.g., if the bit has a value of zero).

As described in more detail below, assigned results buffer identification values are written into a graduation buffer 224. In one embodiment, results buffer completion bits associated with newly renamed instructions are reset/cleared to indicate incomplete results. As instructions complete execution, their corresponding results buffer completion bits are set, thereby enabling the instructions to graduate and release their associated results buffer identification values. In one embodiment, control logic (not shown) ensures that one program thread does not consume more than its share of results buffer entries.

Decoded instructions are written to a decoded instruction buffer 214. An instruction dispatcher 216 selects instructions residing in decoded instruction buffer 214 for dispatch to execution unit(s) 108. In embodiments, instructions can be dispatched for execution out of program order. In one embodiment, instructions are selected and dispatched, for example, based on their age (ID tags) assuming that their operands are determined to be ready.

Instruction execution unit(s) 108 execute instructions as they are dispatched. During execution, operand data is obtained as appropriate from data cache 110, register file 114, and/or results buffer 218. A result calculated by instruction execution unit(s) 108 for a particular instruction is written to a location/entry of results buffer 218 specified by the instructions associated results buffer identification value.

Instruction graduation (represented in FIG. 1 by instruction graduation unit 112) is controlled by a graduation controller 220. Graduation controller 220 graduates instructions in accordance with the results buffer identification values stored in graduation buffer 224. When an instruction graduates, its associated result is transferred from results buffer 218 to register file 114. In conjunction with instruction graduation, graduation controller 220 updates, for example, the free list of results buffer allocater 212 to indicate a change in availability status of the graduating instructions assigned results buffer identification value.

Figure 3:
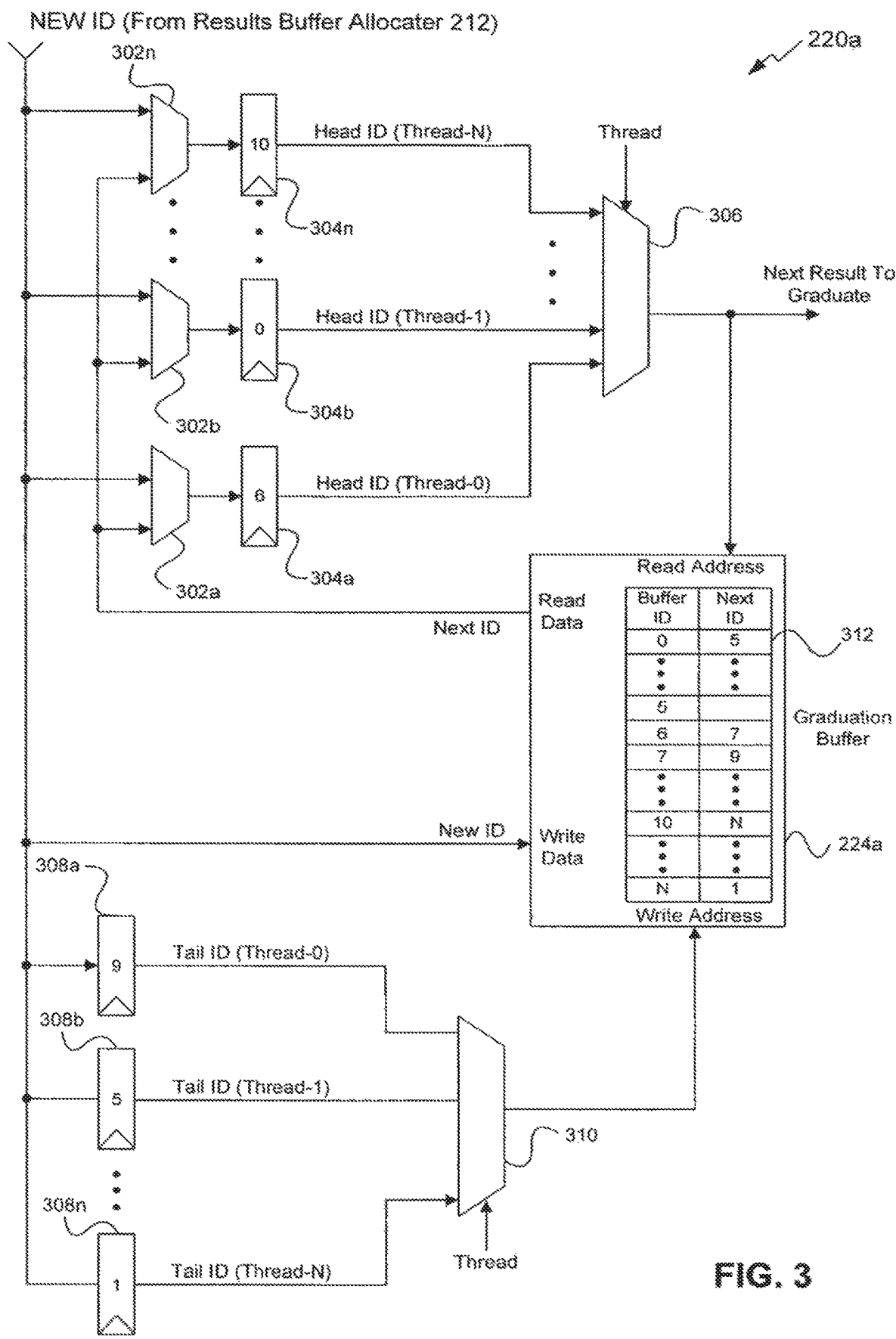
FIG. 3 is a diagram of a first embodiment of a graduation buffer and a graduation controller according to the present invention.

FIG. 3 is a diagram of a graduation controller 220a and a graduation buffer 224a according to a embodiment present invention. In this embodiment, a single instruction is identified for graduation by graduation controller 220 during each instruction graduation cycle.

Graduation controller 220a includes a plurality of 2-to-1 multiplexers 302, a plurality of registers 304, and an N-to-1 multiplexer 306. Graduation controller 220a also includes a plurality of registers 308 and an N-to-1 multiplexer 310. Graduation buffer 224a stores one or more linked-list data structures, each one being associated with a particular program thread that is running on processor 100. Each of the linked-list data structures has an associated head identification (ID) value and an associated tail ID value.

As shown in FIG. 3, each of the 2-to-1 multiplexers 302 is coupled to results buffer allocater 212 (see FIG. 2) and a read data bus of graduation buffer 224a. The outputs of 2-to-1 multiplexers 302 are coupled to the inputs of registers 304. Each register 304 stores a head ID value that is associated with a particular linked-list data structure for a program thread. The output of each register 304 is coupled to N-to-1 multiplexer 306. The output of N-to-1 multiplexer 306 is coupled to a read address bus of graduation buffer 224a and to results buffer 218. Results buffer allocater 212 is also coupled to a write data bus of graduation buffer 224a and to the input of each register 308. Each register 308 stores a tail ID value that is associated with a particular linked-list data structure for a program thread. The output of each register 308 is coupled to N-to-1 multiplexer 310. The output of N-to-1 multiplexer 310 is coupled to a write address bus of graduation buffer 224a.

In an embodiment, graduation controller 220a operates as follows. Results buffer allocater 212 assigns (allocates) a results buffer ID value (new ID) to an instruction being decoded by instruction decoder 208. This new ID is provided to the inputs of 2-to-1 multiplexers 302, a write data bus of graduation buffer 224a, and the inputs of registers 308. This new ID is stored by the appropriate thread tail ID register 308 and, if appropriate, thread head ID register 304. For example, if a first new ID value (e.g., buffer ID 0) is allocated by results buffer allocater 212 for an instruction associated with program thread 1, and if graduation buffer 224*a* currently does not store any ID values associated with program thread 1, the new ID value is stored by thread head ID register 304*b* and thread tail ID register 308*b*. If a second new ID value (e.g., buffer ID 5) associated with program thread 1 is then allocated before the instruction associated with the first new ID graduates, the second new ID value (buffer ID 5) is written to a memory location 312 (i.e., a memory location linked to buffer ID 0). Register 308*b* is accordingly updated to store the second new ID (buffer ID 5) and point to the tail of the linked-list data structure formed for program thread 1.

As shown in FIG. 3, graduation buffer 224*a* also stores a linked list data structure for program thread 0 and a linked list data structure for program thread N. The linked-list data structure stored for program thread 0 is {(6-7), (7-9)}. The linked-list data structure stored for program thread N is {(10-N), N-1)}.

When an instruction graduates, the appropriate thread head ID register 304 is updated to point to the new head value of the linked-list data structure stored. For example, assume that the next instruction to graduate is an instruction associated with program thread 0. As can be seen by looking a thread head ID register 304*a*, the calculated result for this instruction is stored in results buffer entry 6. Thus, when the thread selection value provided to N-to-1 multiplexer 306 selects thread 0, the output of N-to-1 multiplexer 306 will be 6. This value (i.e., 6) is placed on the read address bus of graduation buffer 224*a*, and the associated next ID value (i.e., 7) is provided by the read data bus of graduation buffer 224*a* to an input of 2-to-1 multiplexer 302*a* and stored by thread 0 head ID register 304*a*. In a similar manner, if the next instruction to graduate is an instruction associated with program thread N, register 304*n* will be updated to store the next ID value (i.e., 1) associated with buffer ID N.

As described herein, the total number of program threads running on processor 100 at any given time is variable from one up to a maximum number of threads (e.g., N) supported by processor 100. The number of graduation buffer entries that can be allocated to a particular program thread is independent of the number of threads that can run on processor 100. For example, a single thread can be allocated all of the graduation buffer entries to achieve a maximum single-threaded performance. This point is further illustrated by FIG. 4.

Figure 4:
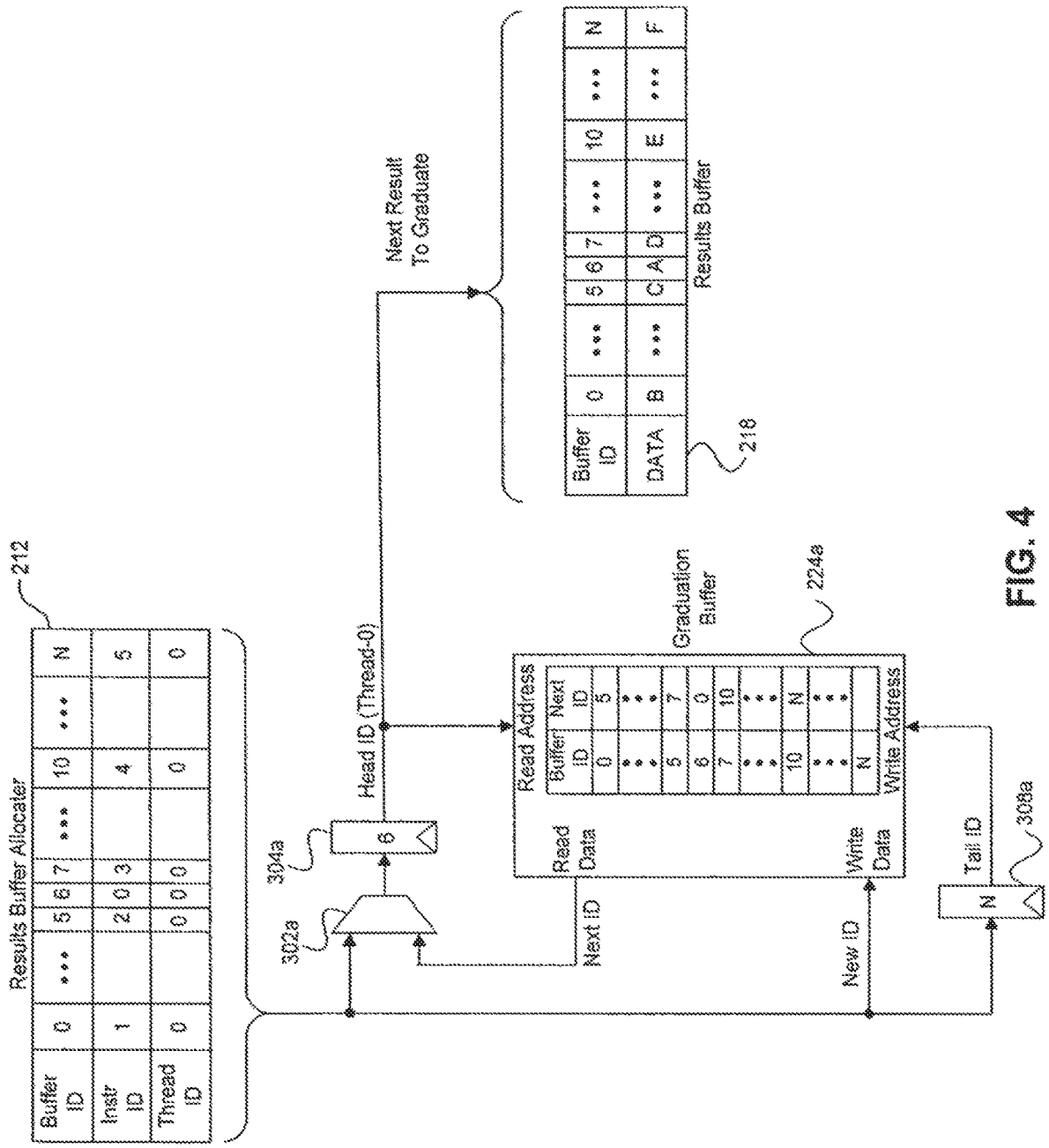
FIG. 4 is a simplified diagram of the graduation buffer and the graduation controller of FIG. 3.

FIG. 4 illustrates the relationship between results buffer allocater 212, results buffer 218, and graduation buffer 224*a* according to an embodiment of the present invention. It also shows the type of information stored by these components. In the example depicted in FIG. 4, only a single program thread is running on processor 100. Since only a single program thread (e.g., program thread 0) is running on processor 100, the control logic required to support multiple program threads (shown in FIG. 3) is not shown for purposes of clarity.

As shown in FIG. 4, results buffer allocater 212 has allocated six results buffer entries to store the results of six instructions belonging to program thread 0. Results buffer entry 6 (represented as Buffer ID 6) has been assigned to an instruction having instruction ID 0. Results buffer entries 0, 5, 7, 10, and N have been assigned to instructions having instruction IDs 1, 2, 3, 4, and 5, respectively. As illustrated by these values, results buffer allocater 212 assigns the entries of results buffer 218 independently of program threads (i.e., there is no limitation regarding with entries of results buffer 218 can be assigned to an instruction based on the program thread to which the instruction belongs.)

In the example of FIG. 4, graduation buffer 224*a* stores a single linked-list data structure associated with program thread 0. The elements of the linked-list data structure are (6, 0), (0, 5), (5, 7), (7, 10), and (10, N). The head ID value of the linked-list data structure (6) is stored in register 304*a*. The tail ID value of the linked-list data structure (N) is stored in register 308*a*. The next instruction to graduate is instruction ID 0, whose calculated resultant value (A) is stored in buffer entry 6 of results buffer 218. Upon graduation of instruction ID 0, the value A stored in buffer entry 6 will be written to a general purpose register of register file 114. Buffer entry 6 will then become available to be assigned/allocated to a new instruction by results buffer allocater 212.

Results buffer 218 in FIG. 4 is shown storing a plurality of values. For example, as noted above, buffer entry 6 stores the value A. Buffer entries 0, 5, 7, 10, and N are shown storing values B, C, D, E, and F, respectively. In one embodiment, whether or not the stored values are valid is determine, for example, by a valid bit stored with each entry of results buffer 218. However, bits used to determine whether an entry is valid or not valid need not be store in results buffer 218. Other means for determining whether an entry is valid or not valid can also be used.

FIG. 5 depicts a Table 1 that further illustrates operation of processor 100. In the embodiment represented by FIG. 5, processor 100 includes the graduation controller 220*a* and the graduation buffer 224*a* shown, for example, in FIG. 3. As noted in FIG. 5, Table 1 depicts an example ten-cycle clock-by-clock progress of buffer entry allocations and graduation of values stored in results buffer 218 for a case in which processor 100 is executing a single program thread.

In clock cycle 1 of Table 1, results buffer allocater 212 of instruction decode and dispatch unit 106 allocates entry 0 of results buffer 218 to a first instruction of a program thread, for example, program thread 0. It is assumed for this example that this is the only buffer entry currently allocated to an instruction belonging to program thread 0. Accordingly, there is no associated linked-list data structure presently stored in graduation buffer 224*a* for program thread 0, and the thread head ID register and the thread tail ID register do not yet contain valid values. The allocated buffer entry ID 0 is provided to graduation controller 220*a* as the New ID shown, for example, in FIG. 4.

In clock cycle 2 of Table 1, as shown by arrows, graduation controller 220*a* updates the thread head ID register 304 and the thread tail ID register 308 with the buffer entry ID value 0 (i.e., the New ID) allocated by results buffer allocater 212 during clock cycle 1. In clock cycle 2, as shown in FIG. 5, results buffer allocater 212 allocates buffer entry 5 to a second instruction of program thread 0. This value (5) is provided to graduation controller 220*a* as illustrated, for example, in FIG. 4. The value 5 is stored in the next ID entry of buffer ID 0, which is the write address specified by the value stored in tail ID register 308, during clock cycle 3.

In clock cycle 3 of Table 1, results buffer allocater 212 allocates buffer entry 7 to a third instruction of program thread 0. As shown in FIG. 5 by arrows, the value 7 is stored in the next ID entry of buffer ID 5, which is the write address specified by the value stored in tail ID register 308, during clock cycle 4. As noted above, in clock cycle 3, graduation controller 220*a* stores the value 5 in the next ID entry of buffer ID 0 (see, e.g., location 312 of graduation buffer 224*a* in FIG. 3). Graduation controller 220*a* also updates thread tail ID register 308 to contain the value 5. As no instruction has yet graduated, the value of thread head ID register 304 remains unchanged.

In clock cycle 4 of Table 1, results buffer allocater 212 allocates buffer entry 10 to a fourth instruction of program thread 0. Graduation controller 220a updates thread tail ID register 308 to contain the value 7, which was allocated by results buffer allocater 212 in clock cycle 3. In clock cycle 4, the result stored in entry 0 of results buffer 218 is graduated by instruction graduation unit 112. As shown by arrows in FIG. 5, during clock cycle 5, the value 5 stored in the Next ID entry of Buffer ID 0 of graduation buffer 224a will be used to update head ID register 304a.

In clock cycle 5 of Table 1, results buffer allocater 212 does not allocate any buffer entry to a new instruction. This situation might arise, for example, due to a branch misprediction that resulted in a processing pipeline purge. During this clock cycle, graduation controller 220a stores the value 10 in the next ID entry of buffer ID 7 of graduation buffer 224a. As noted above, because an instruction was graduated in the previous clock cycle, graduation controller 220a updates thread head ID register 304 to contain the new head value of the linked-list data structure (i.e., the value 5 that identifies the next instruction to be graduated by instruction graduation unit 112). Graduation controller 220a also updates thread tail ID register 308 to contain the value 10, which was allocated during clock cycle 4. In clock cycle 5, the result stored in entry 5 of results buffer 218 is graduated.

In clock cycle 6 of Table 1, the result stored in entry 7 of results buffer 218 graduates. To reflect the fact that an instruction graduated during clock cycle 5, graduation controller 220a updates thread head ID register 304 to contain the value 7 (i.e., the next to graduate).

In clock cycle 7 of Table 1, the result stored in entry 10 of results buffer 218 graduates. In this clock cycle, graduation controller 220a updates thread head ID register 304 to contain the value 10 (i.e., the next to graduate).

In clock cycle 8 of Table 1, no activity takes place.

In clock cycle 9 of Table 1, results buffer allocater 212 of instruction decode and dispatch unit 106 allocates entry N of results buffer 218 to a fifth instruction of program thread 0. This value (N) is provided to graduation controller 220a and used to update thread head ID register 304 and thread tail ID register 308 in clock cycle 10.

In clock cycle 10 of Table 1, graduation controller 220a updates thread head ID register 304 and thread tail ID register 308 with the buffer entry ID value N allocated by results buffer allocater 212 during clock cycle 9.

FIG. 6 depicts a Table 2 that further illustrates the operation of graduation controller 220a. As noted in FIG. 6, Table 2 is a thread head ID and thread tail ID update logic table. This logic table provides implementation information regarding graduation controller 220a to persons skilled in the relevant art(s).

Figure 7:
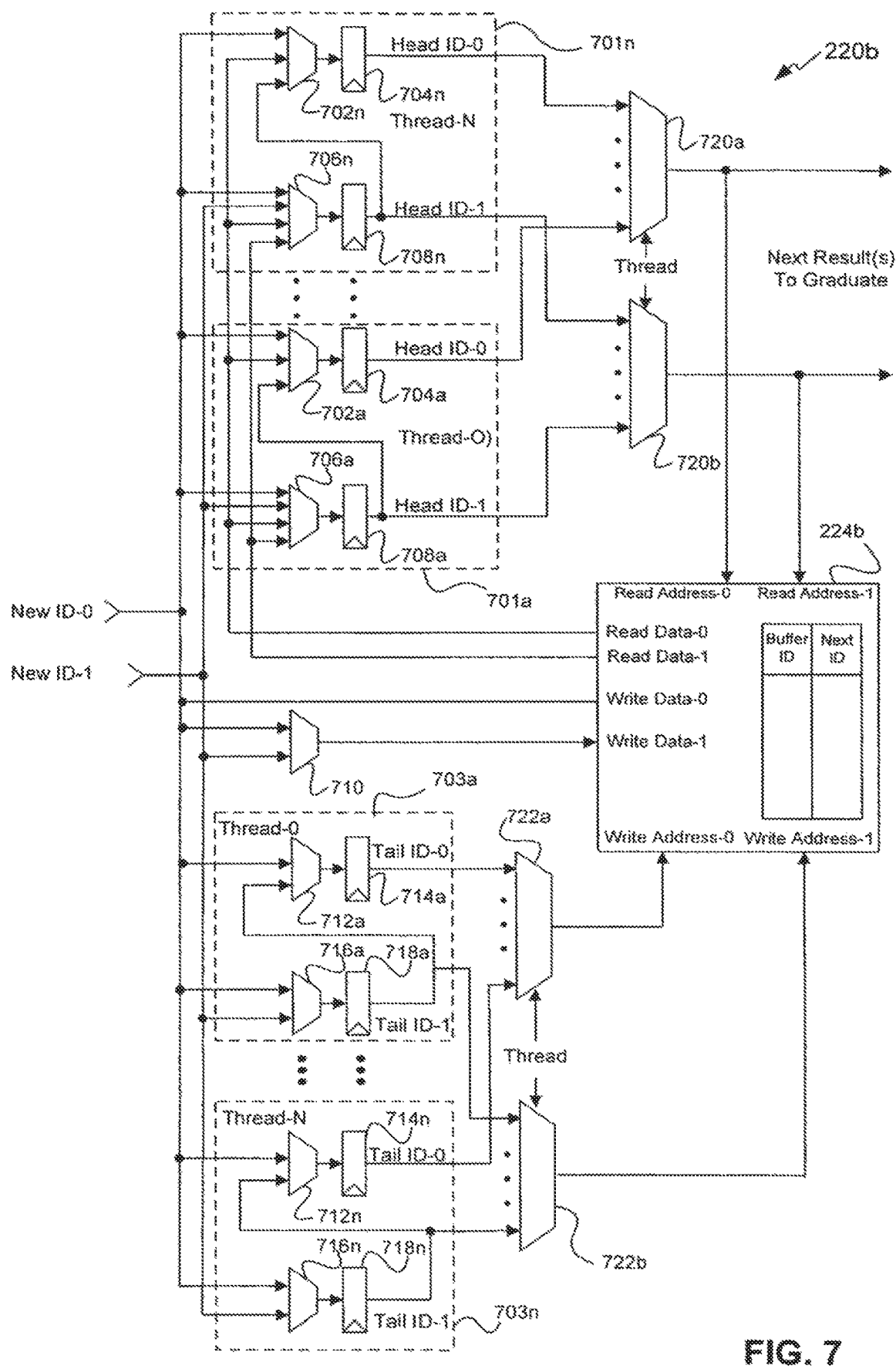
FIG. 7 is a diagram of a second embodiment of a graduation buffer and a graduation controller according to the present invention.

FIG. 7 is a diagram of a graduation controller 220b and a graduation buffer 224b in accordance with another embodiment of the present invention. In this embodiment, two instructions (or their resulting values stored in results buffer 218) are identified for graduation by graduation controller 220b during each instruction graduation cycle.

As shown in FIG. 7, graduation controller 220b includes a plurality of thread head ID units 701 and a plurality of thread tail ID units 703. The number of thread head ID units 701 and the number of thread tail ID units 703 is a design choice. Each thread head ID unit 701 is capable of holding two head ID values (head ID-0 and head ID-1). Each thread tail ID unit 703 is capable of holding two tail ID values (tail ID-0 and tail ID-1). The inputs to graduation controller 220b include a new ID-0 value and a new-ID-1 value generated, for example, by results buffer allocater 212.

The head ID units 701 each include a multiplexer 702 and a register 704 that select and store a head ID-0 value. This head ID-0 value is provided to an N-to-1 multiplexer 720a. The head ID units 701 also each include a multiplexer 706 and a register 708 that select and store a head ID-1 value. This head ID-1 value is provided to an N-to-1 multiplexer 720b. The interconnections of these components is illustrated in FIG. 7.

The tail ID units 703 each include a multiplexer 712 and a register 714 that select and store a tail ID-0 value. This tail ID-0 value is provided to an N-to-1 multiplexer 722a. The tail ID units 703 also each include a multiplexer 716 and a register 718 that select and store a tail ID-1 value. This tail ID-1 value is provided to an N-to-1 multiplexer 722b. The interconnections of these components is also illustrated in FIG. 7.

As shown in FIG. 7, graduation buffer 224b includes a plurality of data and address buses. These buses are used to store and to retrieve linked-list data used to determine the order in which instructions are graduated by instruction graduation unit 112. The connections of these buses to graduation controller 220b and the a new ID-0 value and a new-ID-1 value generated, for example, by results buffer allocater 212 are shown in FIG. 7.

In an embodiment, graduation controller 220b operates as follows. Results buffer allocater 212 assigns (allocates) one or two results buffer ID values (new ID-0 and new ID-1) to one or two instructions of a program thread, respectively, during decoding by instruction decoder 208. The new ID-0 value and the new ID-1 values are processed by the thread tail ID unit 703 associated with the program thread and used, if appropriate, to add one or two new elements to a linked-list data structure residing within graduation buffer 224b. If the new ID value(s) are associated with a program thread for which there is no current linked-list data structure stored within graduation buffer 224b, the new ID value(s) are processed and stored by the appropriate register(s) 704 and 708 of a thread head ID unit 701. When one or two instructions of a program thread are graduated, the head ID unit associated with the program thread is updated to store the value(s) of the next instruction(s) of the program thread to be graduated.

To better understand the operation of graduation controller 220b and graduation buffer 224b, an example in which only a single program thread is running on processor 100 is provided below. This example is described with reference to FIGS. 8 and 9.

Figure 8:
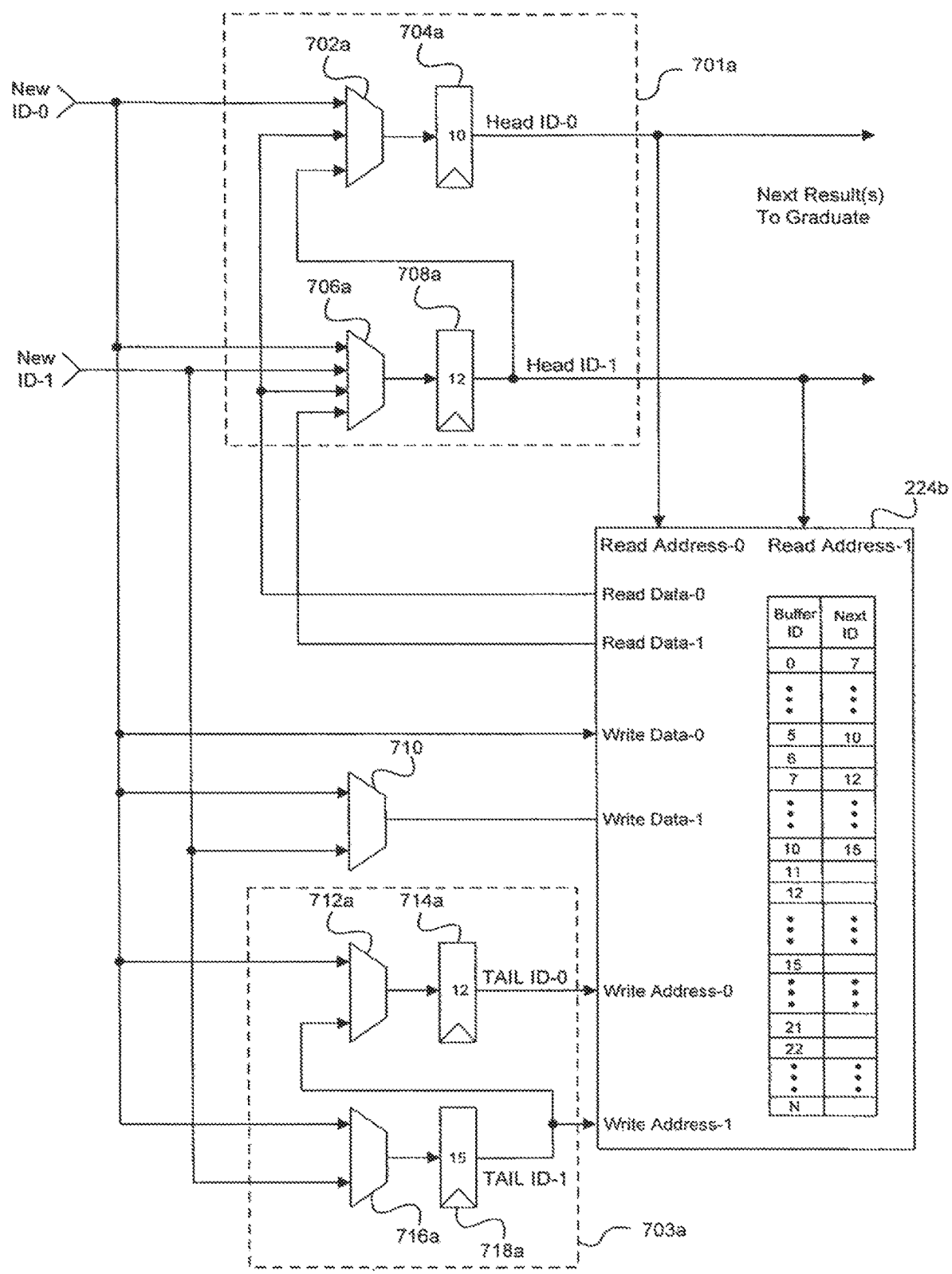
FIG. 8 is a simplified diagram of the graduation buffer and the graduation controller of FIG. 7.

FIG. 8 is a simplified diagram of graduation controller 220b and graduation buffer 224b. FIG. 8 represents an example implementation in which only a single program thread (thread-0) is running on processor 100. In particular, FIG. 8 depicts the state of graduation controller 220b and graduation buffer 224b for clock cycle 5 of Table 3 (see FIG. 9). Since only a single program thread is running on processor 100 in this example, the control logic required to support multiple program threads (shown in FIG. 7) is not depicted for purposes of clarity.

As can be seen in FIG. 8, graduation controller 220b and graduation buffer 224b store elements of a linked-list data structure associated with program thread-0. The head of the linked-list data structure (results buffer entry 10) is stored in head ID-0 register 704a. The second element of the linked-list data structure (results buffer entry 12) is stored in head ID-1 register 708a. The tail value of the linked-list data structure (results buffer entry 15) is stored in tail ID-1 register 718a. The next to the last element of the linked-list data structure (results buffer entry 12) is stored in tail ID-0 register 714a. Based on this information, one can discern that the elements of the linked-list data structure are (10, 12) and (12, 15).

In the next clock cycle, if both the results stored in results buffer entry 10 and results buffer entry 12 graduate, and no new results buffer entry is allocated to an instruction belonging to program thread 0, the value 15 will be read from graduation buffer 224b and stored in head ID-0 register 704a. Because no valid value is stored in graduation buffer 224b for buffer ID 12, the value stored by head ID-1 register 708a will be treated as invalid. The value 15 stored by tail ID-1 register 718a will be transferred to tail ID-0 register 714a. The value stored by tail ID-1 register 718a will be treated as invalid.

In the next clock cycle, if only the result stored in results buffer entry 10 is graduated, and no new results buffer entry is allocated to an instruction belonging to program thread 0, the value 12 stored by head ID-1 register 708a will be transferred to head ID-0 register 704a, and the value 15 will be read from graduation buffer 224b and stored in head ID-1 register 708a. Because no valid value is stored in graduation buffer 224b for buffer ID 12, the value stored by head ID-1 register 708a will be treated as invalid. The value 15 stored by tail ID-1 register 718a will be transferred to tail ID-0 register 714a. The value stored by tail ID-1 register 718a will be treated as invalid.

A more detailed explanation of the operation of graduation controller 220b and graduation buffer 224b is illustrated by Table 3 of FIG. 9.

FIG. 9 depicts a Table 3 that further illustrates the operation of graduation controller 220b and graduation buffer 224b. As noted in FIG. 9, Table 3 depicts an example eight-cycle clock-by-clock progress of buffer entry allocation and graduation of values stored in results buffer 218, for a case in which processor 100 is executing a single program thread.

In clock cycle 1 of Table 3, results buffer allocater 212 of instruction decode and dispatch unit 106 allocates entry 0 of results buffer 218 to a first instruction of a program thread, for example, program thread 0. This allocated buffer entry ID (e.g., New ID-0 shown in FIG. 8) is provided to graduation controller 220b. It is assumed for this example that this is the only buffer entry currently allocated to program thread 0. Thus, there is no associated linked-list data structure presently stored by graduation controller 220b and graduation buffer 224a for program thread 0, and the thread head ID unit 701a and the thread tail ID unit 703a do not yet contain valid values.

In clock cycle 2 of Table 3, as shown by arrows, graduation controller 220b updates thread head ID-0 register 704a and thread tail ID-0 register 714a with buffer entry ID value 0, which was allocated by results buffer allocater 212 during clock cycle 1. As shown in FIG. 9, in clock cycle 2, results buffer allocater 212 allocates buffer entry 5 to a second instruction of program thread 0 and buffer entry 7 to a third instruction of program thread 0. These values, as shown by arrows in FIG. 9, are used to update head ID-1 register 708a, tail ID-0 register 714a, and tail ID-1 register 718a in clock cycle 3. No instructions are graduated during this clock cycle.

In clock cycle 3 of Table 3, results buffer allocater 212 allocates buffer entry 10 to a fourth instruction of program thread 0 and buffer entry 12 to a fifth instruction of program thread 0. During this clock cycle, graduation controller 220b stores the value 7 in the next ID entry of buffer ID 0 of graduation buffer 224b, which was the address pointed to by tail ID-0 register 714a during the previous clock cycle. Graduation controller 220b updates head ID-1 register 708a and thread tail ID-0 register 714a to contain the value 5. Tail ID-1 register 718a is updated to hold the value 7. In clock cycle 3, the results stored in entries 0 and 5 of results buffer 218 are graduated by instruction graduation unit 112.

In clock cycle 4 of Table 3, results buffer allocater 212 allocates buffer entry 15 to a sixth instruction of program thread 0. During this clock cycle, graduation controller 220b stores the values 10 and 12 in the next ID entries of buffer IDs 5 and 7, respectively, of graduation buffer 224b. Graduation controller 220b updates head ID-0 register 704a to contain the value 7 read from buffer ID entry 0 of graduation buffer 224b. Graduation controller 220b also updates head ID-1 register 708a and thread tail ID-0 register 714a to contain the value 10, and thread tail ID-1 register 718a to contain the value 12. In clock cycle 4, the result stored in entry 7 of results buffer 218 is graduated by instruction graduation unit 112.

In clock cycle 5 of Table 3, results buffer allocater 212 allocates buffer entry 21 to a seventh instruction of program thread 0 and buffer entry 22 to an eight instruction of program thread 0. During this clock cycle, graduation controller 220b stores the value 15 in the next ID entry of buffer ID 10 of graduation buffer 224b. Graduation controller 220b updates head ID-0 register 704a to contain the value 10 read from head ID-1 register 708a. Graduation controller 220b updates head ID-1 register 708a to contain the value 12 read from buffer ID entry 7. Graduation controller 220b updates tail ID-0 register 714a to contain the value 12 read from tail ID-1 register 718a. Graduation controller 220b updates tail ID-1 register 718a to contain the value 15 provided by results buffer allocater 212 as a new ID-0 value during clock cycle 4. In clock cycle 5, the results stored in entries 10 and 12 of results buffer 218 are graduated by instruction graduation unit 112. It is this logic state of graduation controller 220b and graduation buffer 224b that is depicted in FIG. 8.

In clock cycle 6 of Table 3, results buffer allocater 212 allocates buffer entry N to a ninth instruction of program thread 0. As shown by arrows in FIG. 9, the value N is stored in the next ID entry of buffer ID 21, which is the write address specified by the value stored in tail ID-0 register 714a, during clock cycle 7. In clock cycle 6, graduation controller 220b updates head ID-0 register 704a to contain the value 15 read from buffer ID entry 10. Graduation controller 220b updates head ID-1 register 708a and tail ID-0 register 714a to contain the value 21 allocated by results buffer allocater 212 in clock cycle 5. Graduation controller 220b updates tail ID-1 register 718a to contain the value 22 provided by results buffer allocater 212 as a new ID-1 value in clock cycle 5. In clock cycle 6, the instruction result stored in entry 15 of results buffer 218 is graduated by instruction graduation unit 112.

In clock cycle 7 of Table 3, graduation controller 220b updates head ID-0 register 704a to contain the value 21. Graduation controller 220b updates head ID-1 register 708a and tail ID-0 register 714a to contain the value 22. Graduation controller 220b updates tail ID-1 register 718a to contain the value N. During this clock cycle, the results stored in entries 21 and 22 of results buffer 218 are graduated by instruction graduation unit 112.

In clock cycle 8 of Table 3, graduation controller 220b updates head ID-0 register 704a and tail ID-0 register 714a to contain the value N. In this clock cycle, the instruction result stored in entry N of results buffer 218 is graduated by instruction graduation unit 112.

FIG. 10 depicts a Table 4 that also illustrates the operation of graduation controller 220b. As noted in FIG. 10, Table 4 is an example thread head ID and thread tail ID update logic table. This logic table provides example state and implementation information regarding the various inputs and outputs of graduation controller 220*b*. For purposes of brevity and clarity, only a few of the row entries are shown in Table 4. A Person skilled in the relevant art(s) will be able to populate all of the row entries of Table 4 given the description of the present invention provided herein.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

The invention claimed is:

1. A processor, comprising:
 a results buffer having a plurality of entries, each buffer entry to store a result of an executed instruction prior to the result being written to a register file;
 a results buffer allocator to allocate a first results buffer identification value to a first decoded instruction of a program thread and to allocate a second results buffer identification value to a second decoded instruction of the program thread, wherein each of the first and second results buffer identification value identifies one of the plurality of entries of the results buffer to which a result of the respective first and second instructions is written;
 a graduation buffer coupled to the results buffer and the results buffer allocator, the graduation buffer having a plurality of entries to store results buffer identification values including the first and second results buffer identification values as part of a linked-list data structure for the program thread; and
 a graduation controller comprising:
  a thread-tail ID unit associated with the program thread, the thread-tail ID unit coupled to the results buffer allocator and the graduation buffer, the thread-tail ID unit to store the first and second results buffer identification values of the program thread,
  a thread-head ID unit associated with the program thread, the thread-head ID unit coupled to the graduation buffer to store the results buffer identification values stored at the linked-list data structure; and
 the graduation controller to:
  add the first and second results buffer identification values stored at the thread-tail ID unit to the linked-list data structure for the program thread,
  add the first and second results buffer identification values stored at the linked-list data structure to the thread-head ID unit over one or more clock cycles, and
  identify from the thread-head ID unit two instructions of the program thread for graduation during an instruction graduation cycle.

2. The processor of claim 1, wherein the graduation controller includes a plurality of thread-head-ID units.

3. The processor of claim 2, wherein each thread head-ID unit comprises a first head-ID unit multiplexer coupled to a first head-ID unit register to select and store the first results buffer identification values.

4. The processor of claim 2, wherein each thread head-ID unit comprises a second head-ID unit multiplexer coupled to second head-ID unit register to select and store the second results buffer identification values.

5. The processor of claim 3, wherein each first head-ID multiplexer of the respective thread head-ID units is coupled to the results buffer allocator, the graduation buffer and the output of a second head-ID unit register of the respective thread head-ID unit for receiving inputs therefrom, the inputs received at the first head-ID multiplexer selected and stored as the first results buffer identification values.

6. The processor of claim 4, wherein each second head-ID multiplexer of the respective thread head-ID units is coupled to: the results buffer allocator and the graduation buffer for receiving inputs therefrom, the inputs received at the second head-ID multiplexer selected and stored as the first results buffer identification values.

7. The processor of claim 4, wherein the graduation controller comprises a first controller multiplexer to receive as inputs, stored first results buffer identification values and a second controller multiplexer to receive as inputs, the stored second results buffer identification values.

8. The processor of claim 7, wherein an output of the first controller multiplexer is coupled to the results buffer and to a first address bus of the graduation buffer.

9. The processor of claim 7, wherein an output of the second controller multiplexer is coupled to the results buffer and to a second address bus of the graduation buffer.

10. The processor of claim 1, wherein the graduation controller includes a plurality of thread-tail-ID units.

11. The processor of claim 10, wherein each thread tail-ID unit comprises a first tail-ID unit multiplexer coupled to a first tail-ID unit register to select and store a first tail-ID value.

12. The processor of claim 2, wherein each thread head-ID unit comprises a second tail-ID unit multiplexer coupled to a second tail-ID unit register to select and store a second tail-ID value.

13. The processor of claim 11, wherein the first tail-ID multiplexer is coupled to: the results buffer allocator and to the output of a second tail-ID unit register for receiving for receiving inputs therefrom, the inputs received at the first tail-ID multiplexer selected and stored as the first tail-ID value.

14. The processor of claim 12, wherein the second tail-ID multiplexer is coupled to: the results buffer allocator for receiving results buffer allocator identification values therefrom, the inputs received at the second tail-ID multiplexer selected and stored as the second tail-ID value.

15. The processor of claim 14, wherein the graduation controller comprises a third controller multiplexer to receive as inputs, the stored first tail-ID values and a fourth controller multiplexer to receive as inputs, the stored second tail-ID values, wherein an output of the third controller multiplexer is coupled to a third address bus of the graduation buffer, and wherein an output of the fourth controller multiplexer is coupled to a fourth address bus of the graduation buffer.

16. The processor of claim 1, wherein a first entry in the linked list data structure comprises a buffer ID to store an allocated results buffer identification value, and a next buffer ID to store a newly allocated results buffer identification value, the next buffer ID having a value equal to the buffer ID of a second entry in the linked-list data structure.

17. The processor of claim 16, wherein the first entry of the linked list data structure is stored at a first head-ID unit register and a second entry of the linked list data structure is stored at a second head-ID unit register and wherein a next to last entry of the linked list data is stored at a first tail-ID unit register and a last entry of the linked list data structure is stored at a second tail-ID unit register.

18. The processor of claim 17, wherein when two instructions of the program thread graduate, the first and second head-ID unit registers are updated to store the values of the next two instructions of the program thread to be graduated.

19. An instruction graduation unit for a processor, comprising:
 a graduation buffer having a plurality of entries, wherein each entry stores therein a results buffer identification value, wherein each results buffer identification value identifies a register in a result buffer, wherein each results buffer identification value is generated by an instruction decode and dispatch unit of the processor as part of a linked-list data structure for a program thread, wherein a first entry in the linked-list data structure comprises a buffer ID to store an allocated results buffer identification value, and a next buffer ID to store a newly allocated results buffer identification value, the next buffer ID having a value equal to the buffer ID of a second entry in the linked-list data structure; and
 a graduation controller, comprising:
  a thread-tail ID unit associated with the program thread, the thread-tail ID unit coupled to a results buffer allocator and the graduation buffer, the thread-tail ID unit to store first and second results buffer identification values of the program thread,
  a thread-head ID unit associated with the program thread, the thread-head ID unit coupled to the graduation buffer to store results buffer identification values from the linked-list data structure; and
 the graduation controller to:
  add the first and second results buffer identification values stored at the thread-tail ID unit to the linked-list data structure for the program thread,
  add the first and second results buffer identification values stored at the linked-list data structure to the thread-head ID unit over one or more clock cycles, and
  identify from the thread-head ID unit two instructions of the program thread for graduation during an instruction graduation cycle.

20. A non-transitory computer readable storage medium comprising a processor embodied in software, the processor comprising:
 a results buffer having a plurality of entries, each buffer entry to store a result of an executed instruction prior to the result being written to a register file;
 a results buffer allocater to allocate a first results buffer identification value to a first decoded instruction of a program thread and to allocate a second results buffer identification value to a second decoded instruction of the program thread, wherein each of the first and second results buffer identification values identifies one of the plurality of entries of the results buffer to which a result of the respective first and second instructions is written;
 a graduation buffer coupled to the results buffer and the results buffer allocator, the graduation buffer having a plurality of entries to store results buffer identification values including the first and second results buffer identification values as part of a linked-list data structure for the program thread; and
 a graduation controller comprising:
  a thread-tail ID unit associated with the program thread, the thread-tail ID unit coupled to the results buffer allocator and the graduation buffer, the thread-tail ID unit to store the first and second results buffer identification values of the program thread,
  a thread-head ID unit associated with the program thread, the thread-head ID unit coupled to the graduation buffer to store results buffer identification values stored at the linked-list data structure; and
 the graduation controller to:
  add the first and second results buffer identification values stored at the thread-tail ID unit to the linked-list data structure for the program thread,
  add the first and second results buffer identification values stored at the linked-list data structure to the thread-head ID unit over one or more clock cycles, and
  identify from the thread-head ID unit two instructions of the program thread for graduation during an instruction graduation cycle.

* * * * *